CHECKING SYSTEM FOR DATA SELECTION NETWORK

Filed April 15, 1959

2 Sheets-Sheet 1

INVENTOR.
JAMES H. POMERENE
BY Darby & Darby
ATTORNEYS

July 17, 1962 J. H. POMERENE 3,045,209

CHECKING SYSTEM FOR DATA SELECTION NETWORK

Filed April 15, 1959 2 Sheets-Sheet 2

INVENTOR.
JAMES H. POMERENE

BY

Darby & Darby

ATTORNEYS

United States Patent Office 3,045,209
Patented July 17, 1962

3,045,209

CHECKING SYSTEM FOR DATA SELECTION NETWORK

James H. Pomerene, Poughkeepsie, N.Y., assignor to International Business Machines Corporation, New York, N.Y., a corporation of New York Filed Apr. 15, 1959, Ser. No. 806,523
8 Claims. (Cl. 340—147)

This invention relates to a data handling system and more particularly to a checking system for use with a data selection network.

In performing operations in data handling systems, for example, digital computers, involving the storage and transmission of digital information, there is always the possibility of the occurrence of errors which affect the system in such a manner so as to produce erroneous results. Some of the causes of these errors are faulty storage in the computer storage means, circuit component deterioration and failure, external transient effects, etc. Since in most cases, it is not possible to eliminate the causes of the errors before they occur, it is therefore desirable to provide an indication of the occurrence of an error during the storage, selection or transmission of the digital data, so that the data handling system will not perform useless operations and calculations on erroneous data. If the data handling system is constructed so as not to be burdened with performing these useless operations and calculations, its data handling capacity is subtially increased.

The present invention deals with an error checking and indicating system for use with a two-level matrix selection network. The two-level matrix selection network, is a data selecting system used for reading out of or writing into any part of a Storage Register a selected Byte of information. The Storage Register is capable of storing a Word of information which consists of a number of Bytes, each Byte being formed by a predetermined number of consecutive basic units of digital information called Bits.

In the two-level matrix system, a first-level matrix is used to simultaneously select a number of consecutive Bits of information from the Storage Register, beginning at any Bit position of the Register. These selected Bits contain the desired Byte and a number of extra Bits. These selected Bits are then conveyed to a second-level matrix which separates the selected Byte from the group of Bits supplied to the second-level matrix. The selected Byte is then either stored in another storage register or else conveyed to some other device where it is to be utilized.

It is possible for errors to occur during the transfer of the group of Bits from the first-level matrix to the second-level matrix or during the storage of the Bits at either the first or the second-level matrices. Since these errors cannot be eliminated entirely, as previously pointed out, it is therefore desirable to provide a system which is capable of checking the data handling system and providing an indication of the occurrence of an error. When this is done, the data handling system can be so arranged so that it will not perform any operations on the erroneous data. In this manner, the data handling capacity of the system is increased since it does not operate during the period of time when erroneous data is present.

The present invention provides an arrangement for checking the accuracy of data transmitted between the first and second register. This is accomplished by producing a Parity Bit, i.e. a Bit which is representative of the number of binary 1's or 0's, for two adjacent Bytes of the Storage Register, from which the selected Byte is to be taken. The Bit representing signal from the two adjacent Bytes and their associated Parity Bit are transferred to a second-level matrix, where the Bits of the selected Byte are separated from the other Bits and the Parity Bit and transferred to a second register or utilization device. The parity of the selected Byte and the parity of the remaining Bits and Parity Bits is checked to determine whether the number of 1 Bits transferred to the second-level matrix is odd or even. A signal is produced which is representative of each parity check. These two signals are compared, and a signal is produced which is representative of whether the data transfer was correct.

It is therefore an object of this invention to provide a checking system for a data transfer network.

It is a further object of this invention to provide a checking system for a data selection network of the two-level matrix type.

Yet another object of this inventon is to provide a data checking system for use with a two-level matrix selection network in which a parity check is made of the data transfer between the first and second register.

Still another object of this invention is to provide a data checking system for use with a two-level matrix selection network in which a parity check is made of the data transfer between the first-level matrix and second-level matrix and in which an indication is given of the occurrence of an error during the transfer.

Other objects of the invention will be pointed out in the following description and claims and illustrated in the accompanying drawings, which disclose, by way of examples, the principle of the invention and the best mode, which has been contemplated, of applying that principle.

Referring to the drawings.

Figures 1, 1A, 1B:
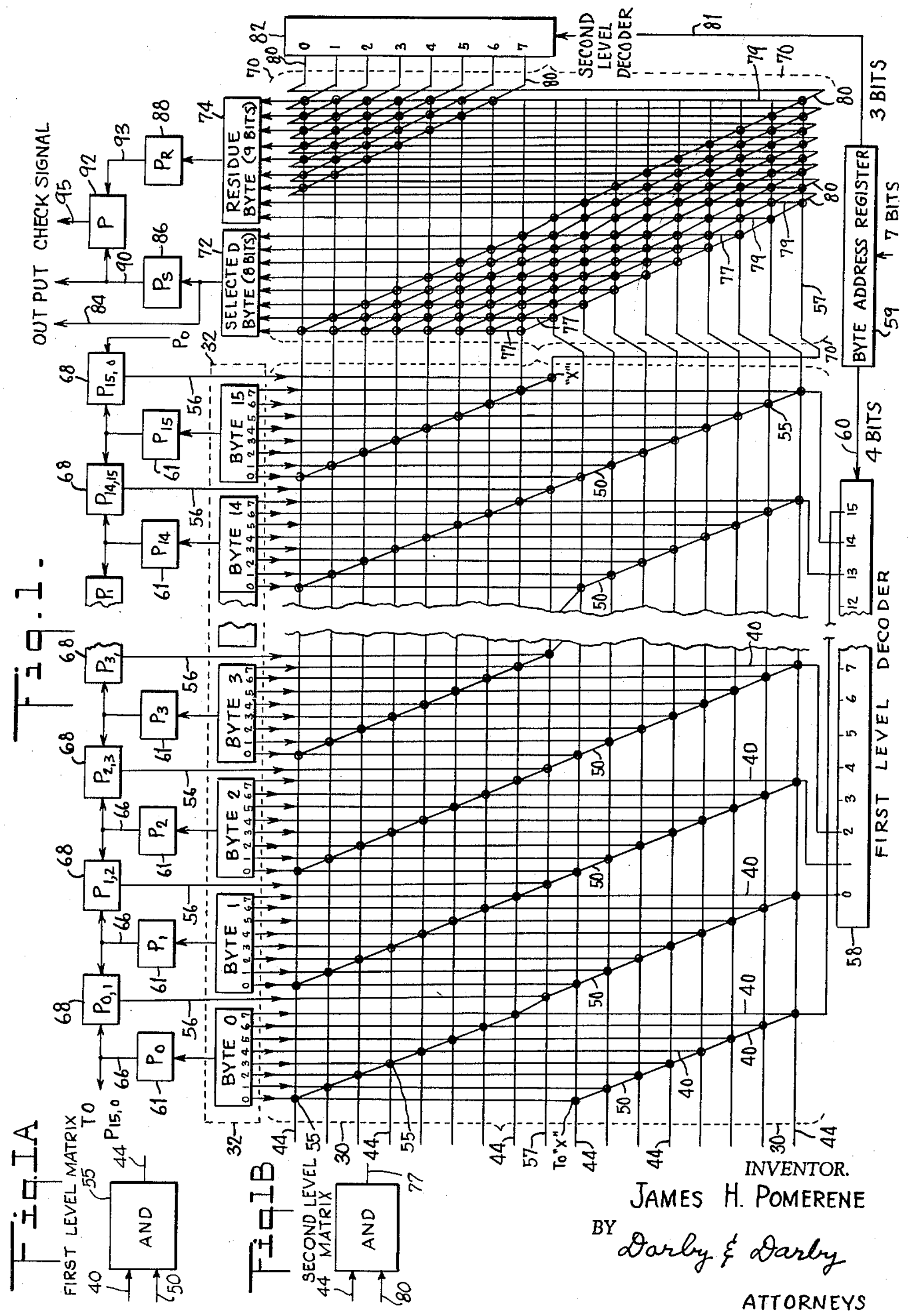
FIGURE 1 shows a schematic representation of a checking system and a two-level data selection network.
FIGURE 1A shows a block diagram representation of an AND logic circuit for the switching elements of the first level matrix.
FIGURE 1B shows a block diagram representation of an AND logic circuit for the switching elements of the second level matrix.

Referring to FIGURE 1, the two-level matrix selection network is formed by a first-level matrix 30 and a second-level matrix 70. The first-level matrix 30 is connected to a Storage Register 32, which is diagrammatically represented by the rectangular block. Storage Register 32 is formed by a number of storage elements (not shown). The Register storage elements are any suitable bistable elements, for example, Flip-Flop circuits utilizing transistors or the like which are capable of maintaining two stable states, usually referred to as 1 or 0. The storage elements are used to store the Bits of digital information which are to be handled by the computer system. The Storage Register 32 is divided into a number of equal size information segments, called Bytes, formed by a predetermined number of consecutive Bits. The Bits of information are applied to the storage elements of the Storage Register 32 from another main storage register (not shown) or else the Storage Register 32 may be considered as the main register.

As illustrated, Storage Register 32 has sixteen Byte size segments each consisting of eight Bits of information. These Byte size segments are designated Byte 0, Byte 1, . . . Byte 15 and the respective Bits are designated as Bit 0, Bit 1, . . . Bit 7. The sixteen eight Bit Bytes form a 128 Bit Word which is handled by the Storage Register 32 in Byte size segments of eight Bits.

While a Storage Register 32 is shown which handles a 128 Bit Word in Byte size segments of 8 Bits, it should be realized that the present invention may be used with any type of Storage Register, in which any size Word is stored and in which the Word is handled in any size Byte segments.

The first-level matrix 30 has a plurality of column lines 40, each of which is connected to a storage element in the Storage Register 32. There are as many column lines 40 in the first-level matrix 30 as there are storage elements, and consequently Bits of information, in the Storage Register 32.

The first-level matrix 30 also has a plurality of row lines 44, illustratively shown as sixteen, each of which intersects selected ones of the column lines 40. The row lines 44 extend beyond the first-level matrix 30 to form the row lines of the second-level matrix 70, as will be described. The first-level matrix 30 is also provided with a number of control lines 50 which are so located on the matrix so as to intersect all of the row lines 44 of the first-level matrix 30 and a predetermined number of the column lines 40. As shown, each of the control lines 50 intersects the sixteen column lines 40 which are connected to the storage elements of two adjacent Bytes of information. Each of the control lines 50 is separated from an adjacent control line, on either side, by a predetermined number of column lines 40, which is equal to the number of Bits contained in a Byte, here shown as eight.

Located at each intersection of a column line 40, a row line 44 and a control line 50 is a switching element 55, which is schematically represented by the dots at each of the respective intersections. In the embodiment of the invention shown, there are two such intersections associated with any column line 40 and therefore there will be two switching elements 55 associated with each column line 40. It is the function of the switching elements 55 to provide access for the Bits stored in the Register 32 to the row lines 44, along which they are transferred to the second-level matrix 70. Each of the switching elements 55 may be considered as an AND circuit, which is shown in FIGURE 1A. When information is being Read Out of the Storage Register 32 the inputs of an AND circuit are a column line 40 and a control line 50 and the output is a row line 44. In operation, when a signal is present on column line 40, the application of a signal as the control line 50 connected to the AND circuit, causes the production of a signal on the row line 44. If desired, a suitable driver may be provided between each switching element 55 and the Register storage element to which it is connected.

In a preferred embodiment of the invention, switching transistors are used for the switching elements 55. When data flow is out of the Register 32, each of the transistor switching elements is so arranged at an intersection so that its base electrode is connected to the column line 40, its emitter electrode to the control line 50, and its collector electrode to the row line 44. Switching circuits using transistors in similar environments are well known. To explain the operation of one such switching circuit, consider that a PNP transistor is used at each intersection, connected as described above, with the addition of suitable biasing voltages. The presence of a binary 1 digit in the register storage element places a negative signal on the transistor base electrode. In the absence of a positive drive, or gating, pulse on the control line 50, the transistor is non-conducting and the collector electrode remains at the biasing potential. When the control line is energized with the positive pulse, the transistor conducts and a positive pulse appears at its collector electrode. This pulse is therefore applied to the row line 44. If the storage element connected to the transistor base electrode has a binary 0 digit, the transistor remains non-conducting upon application of the positive drive pulse. In this manner, an instantaneous data transfer or Read Out to the row lines 44 is obtained of the data stored in the register storage elements associated with the column lines 40 located along the energized diagonal line 59.

The first-level matrix is also provided with a parity row line 57 whose function will be described. The parity row line 57 intersects all of the control lines 50 and is illustratively located midway between the sixteen row lines 44. This location is the most practical in terms of matrix wiring simplicity, but it should be realized, that the parity row line 57 may be located at other places in the matrix, for example, below the last row line 44.

Associated with each Byte of the Storage Register 32 is a corresponding $P_1$ parity circuit 61, designated as $P_0$, $P_1$, $P_2$, . . . $P_{15}$. It is the function of each of the parity circuits 61 to generate a Parity Bit of information, either a 1 or 0, which is representative of whether the number of binary 1 digits in the Byte to which the respective $P_1$ parity circuit 61 is connected is odd or even. In the checking system of the present invention, an even Parity Bit scheme is used, wherein a binary 1 digit is produced by a $P_1$ parity circuit 61 if the number of binary 1's contained in its associated Byte is odd, and a binary 0 is produced if the number of binary 1's contained in the Byte is even.

Figure 2:
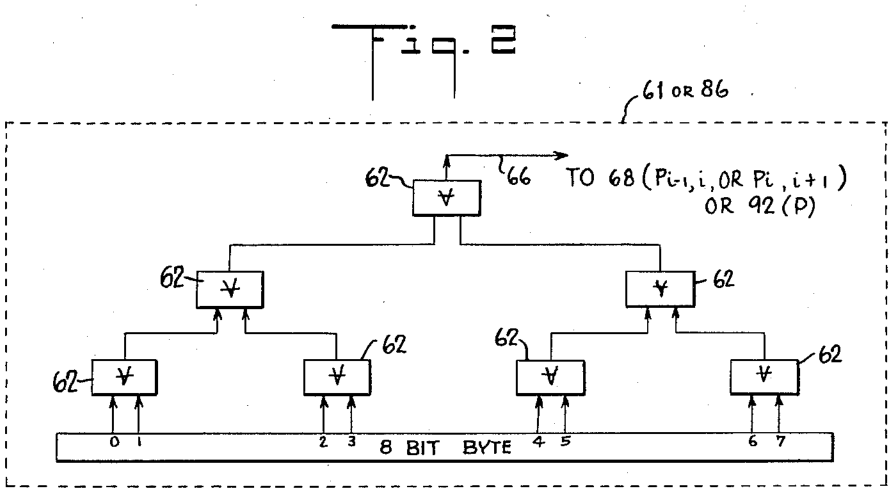
FIGURE 2 shows a diagrammatic representation of a Parity circuit.

FIGURE 2 shows one type of parity circuit which may be used to generate an even Parity Bit for an 8 Bit Byte. The parity circuit of FIGURE 2 is formed by a number of tiers of EXCLUSIVE OR circuits 62 which are arranged in a pyramidal manner. For the purposes of the parity circuits herein described, the term EXCLUSIVE OR circuit may be understood to comprise any logical circuit which produces a binary 1 at its output, when there is a binary 1 at either one, but not both, of its inputs. Stated another way, the EXCLUSIVE OR circuit has a binary 1 output when its input consists of a binary 0 and a binary 1 and a binary 0 output if the inputs are two 1's or two 0's.

The bottom, or first tier of the parity circuit 61 has four EXCLUSIVE OR circuits 62, each of which has two input lines. The eight input lines are connected to the eight storage elements of the Register 32 which store the eight Bits, Bit 0 . . . Bit 7, of the Byte whose parity is being checked. The output lines of the four EXCLUSIVE OR circuits 62 of the first tier are the inputs for two similar EXCLUSIVE OR circuits 62 located in a second tier of the parity circuit. The two EXCLUSIVE OR circuits 62 of the second tier function in a manner similar to the EXCLUSIVE OR circuits 62 of the first tier, and their two output lines are the inputs of a single third tier EXCLUSIVE OR circuit 62. The signal produced at the output line 66 of the single EXCLUSIVE OR circuit of the third tier is the Parity Bit which is generated for the particular Byte to which the parity circuit is connected.

To illustrate the operation of an eight Bit Byte even Parity Bit circuit which is formed by a number of EXCLUSIVE OR circuits, consider the case where the parity of a Byte of information which stores the binary digits shown below is to be checked:

| Bit | 0 1 2 3 4 5 6 7 | |
|---|---|---|
| | 1 1 0 0 1 0 0 1 | Input to first tier EXCLUSIVE OR's. |
| | 0 0 1 1 | Output of first tier EXCLUSIVE OR's and input to second tier EXCLUSIVE OR's. |
| | 0 0 | Output of second tier EXCLUSIVE OR's and input to third tier EXCLUSIVE OR |
| | 0 | Parity Bit. |

Therefore it is seen that since the input to the parity circuit 61 was an even number of binary 1 Bits of information, the Parity Bit which is produced is a binary 0.

To illustrate the generation of a binary 1 Parity Bit consider a situation where the Bits of information stored in the Byte whose parity is being checked are as follows:

| Bit 0 1 2 3 4 5 6 7 | |
|---|---|
| 1 0 0 0 1 0 0 1 | Input to first tier EXCLUSIVE OR's. |
| 1 0 1 1 | Output of first tier EXCLUSIVE OR's and input to second tier EXCLUSIVE OR's. |
| 1 0 | Output of second tier EXCLUSIVE OR's and input to third tier EXCLUSIVE OR. |
| 1 | Parity Bit. |

Therefore it is seen that a binary 1 Byte Parity Bit is produced when the input to the parity circuit comprises an odd number of binary 1 digits.

Figure 3:
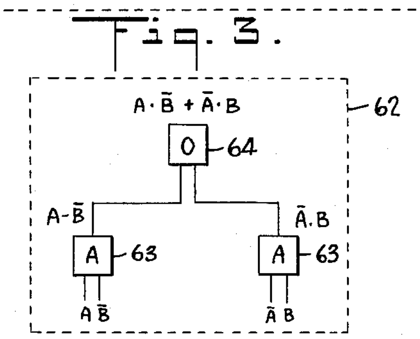
FIGURE 3 shows a diagrammatic representation of the logical blocks which form one of the EXCLUSIVE OR circuits of the Parity circuits.
Figure 4:
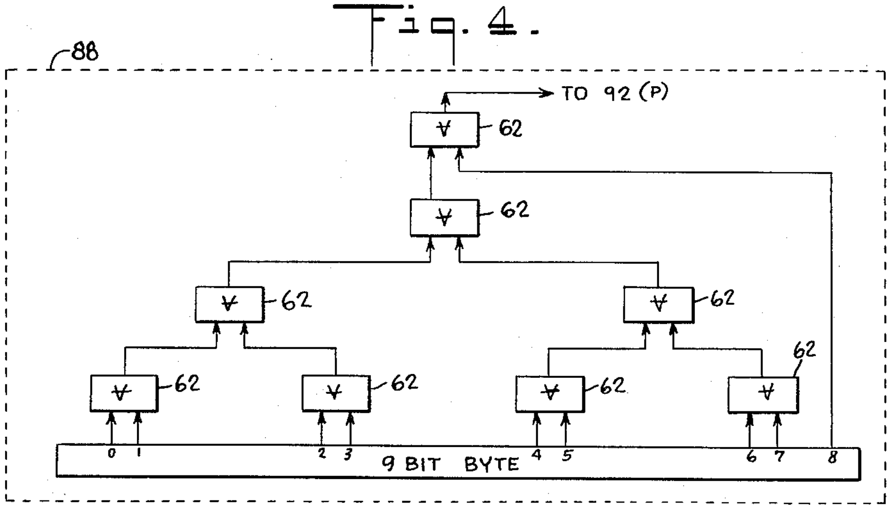
FIGURE 4 shows a diagrammatic representation of another form of Parity circuit.

The EXCLUSIVE OR circuits which are used in any of the parity circuits of the checking system form no part of the present invention. Any suitable arrangement of logical circuits may be used to form the EXCLUSIVE OR circuits. For example, they may be formed by a suitable arrangement of AND and OR circuits such as that shown in FIGURE 3. In FIGURE 3, the two AND circuits 63 have outputs which are used for the input lines of an OR circuit 64. The construction of the AND and the OR circuits is well known and therefore needs no further description. In the circuit of FIGURE 3, the binary signals of the two Bits are represented as A and B and their complements are represented by $\bar{A}$ and $\bar{B}$. The AND circuit at the left of the diagram is arranged to produce an output signal, a binary 1, only when the input is A and $\bar{B}$ and the other AND circuit produces a 1 output signal only when its inputs are $\bar{A}$ and B. (Consider A and B as a binary 1 and $\bar{A}$ and $\bar{B}$ as a binary 0). This result is shown by the logical equations of the outputs of the two AND circuits, $A\cdot\bar{B}$ and $\bar{A}\cdot B$. The output lines of the two AND circuits are connected to the inputs of an OR circuit which will produce an output signal, also a binary 1, upon the occurrence of a binary 1 signal at the outputs of either of the AND circuits. This is shown by the logical equation at the output of the OR circuit 64, $A\cdot\bar{B}+\bar{A}\cdot B$, which means that a binary 1 signal will be produced in response to either an $A\cdot\bar{B}$ or an $\bar{A}\cdot B$, signal at the input of the AND circuits 63. In this manner, an EXCLUSIVE OR circuit, which produces a binary 1 signal in response to only a 1 and 0 signal may be formed. Other suitable arrangements of logical circuits may also be used. One such circuit is shown in the United States patent to Harold Fleisher, No. 2,850,647, which is assigned to the assignee of this application.

The output line 66 of each parity circuit 61 is connected to one of the inputs of each of two parity circuits 68, which are generally designated by the expression $P_{i-1,\,i}$ and $P_{i,\,i+1}$ and shown as $P_{0,\,1}, P_{1,\,2} \ldots P_{15,\,0}$.

For example, if "*i*" is equal to 2, the output line 66 of the $P_2$ parity circuit 61 is connected to the $P_{1,\,2}$ and $P_{2,\,3}$ parity circuits 68. These parity circuits 68 are formed by a single EXCLUSIVE OR circuit whose inputs are the Parity Bits which are present on the output lines 66 of adjacent parity circuits 61. A Parity Bit which is representative of the parity of two adjacent Bytes of the Storage Register 32 is generated by means of a parity checking circuit 68.

The Parity Bits which are produced as a result of the parity checks of two adjacent Bytes are directly conveyed over parity bit column lines 56, each of which intersects with the intersection of a control line 50 and the parity row line 57. Located at each intersection of a parity column line 56, the parity row line 57 and a control line 50 is a switching element 55, which is connected in a manner similar to the connections described with respect to the other switching elements 55. In this manner, Parity Bits are produced for adjacent Bytes of information and the Parity Bit so produced is applied to an input of a switching element 55, where it is available for transfer to the second-level matrix 70, to be used in a manner to be described.

As was previously stated, it is the function of the two-level selecting network to select a desired Byte of information beginning at any Bit position in the Register 32. The first-level matrix 30 performs a part of the function by selecting a group of Bits which not only contains the desired Byte but which also contains a number of extra Bits, including one Parity Bit, and transferring these Bits to the second level matrix 70, where the final selection of the desired Byte is performed. These extra Bits and the Parity Bit are used to perform the checking function as will be described. As can be seen in FIGURE 1, the switching elements 55 which are connected to the storage elements of the Bits of two adjacent Bytes, and the switching element 55 which is located between these two Bytes and connected to the Parity Bit producing circuit 68 are all located along one control line 50. Since the Byte to be selected has only eight Bits it must occur, at most, in two adjacent Bytes in the Register 32. Therefore, when the control line 50 which is associated with the switching elements 55 connected to two adjacent Bytes is supplied with a control signal, the Bits representing information of the desired selected Byte and the extra Bits in the two adjacents Bytes, which are not part of the selected Byte, and the Parity Bit of these two Bytes are also transferred to the second-level matrix 70.

In order to accomplish the selection of one of the control lines 50 of the first-level matrix 30 a First Level-Decoder 58 and a Byte Address Register 59 are provided. The First-Level Decoder 58 has sixteen output positions, designated as 0, 1, 2, . . . 15. A control line 50 is connected to each of these output positions. The First-Level Decoder 58 selects one of the control lines 50, along which the switching elements 55 to which the Bit representing signals of the desired Byte and the extra Bits are applied. A control signal is applied to this line so that these Bit representing signals may be gated onto the row lines 44 for transfer to the second-level matrix 70. In order to accomplish the selection and energization of the proper control line 50, the Byte Address Register 59 is used to supply an Address of binary Bits over line 60 to the First-Level Decoder 58. The Byte Address Register 59 may be any suitable device which is capable of producing a number of Address Bits of information in response to some external command or signal source which chooses the selected Byte. For example, the Byte Address Register 59 may be formed by a number of Flip-Flop circuits whose outputs are determined by signals from punched cards, magnetic tape, or signals from other parts of a computer, etc.

In response to the Address, the First-Level Decoder produces a control signal at one of its outputs which allows the Bit representing information applied to inputs of the switching elements 55, located along the control line 50 which is connected to the Decoder output at which the control signal is produced, to be gated onto the row lines 44. The Address, in the present embodiment of the invention, consists of 4 binary Bits, which form any number from 0 to 15 in binary notation. These four Address Bits are used to determine which one of the sixteen output positions of the First-Level Decoder 58 is to be energized with a control signal. The First-Level Decoder 58 may comprise any suitable device which is capable of producing an output signal at a particular one of a number of output positions in response to Address Bits and may, for example, be a matrix switch which is formed by a number of diodes. In this arrangement, the matrix switch would have four inputs, one for each Address Bit, and sixteen outputs, one for each control line 50. A matrix switch which may be used for the First-Level Decoder 58 upon provision of the proper number of input and output lines is described at pages 56–59 of "Digital Computer Components and Circuits," by R. K. Richards, published in November 1957 by D. Van Nostrand Company, Inc., New York, N.Y. It should also be realized that any other suitable decoder which is capable of selecting an output line in response to Address Bits may also be used. These would include magnetic core matrices or switches, an OR logic or an AND logic matrix, etc. If a Register 32 is used which stores more than 128 Bits, the First-Level Decoder 58 would have more output positions and the Byte Address Register 59 would supply more than four Address Bits.

The bit representing signals which are gated through the switching elements 55 located along the energized control line 50 are transferred down the associated row lines 44 and 57. These row lines extend into and form the row lines of the second-level matrix 70. In this manner, sixteen Bits and the Parity Bit are Read Out of the first-level matrix and transferred to the second-level matrix 70. It is the function of the second-level matrix 70 to select the desired eight Bit Byte beginning at any Bit position of the two Byte group of Bits which was selected by the first-level matrix 30. In the present invention, a checking circuit is associated with the second-level matrix 70, which utilizes the Bits of the unwanted Byte and the Parity Bit, to check the accuracy of the data transfer from the Register 32, through the first-level matrix 30 to the second-level matrix 70. The checking circuit also provides an indication if an error occurred during the transmission of the information.

In order to accomplish the selecting of the desired Byte and the checking of the data transfer, the second-level matrix 70 is provided with a Selected Byte Register 72, which is used to store the selected eight Bit Byte and a Residue Byte Register 74 which is used to store the extra eight Bit which was transferred from the first-level matrix 30, and the Parity Bit. Each of the Registers 72 and 74 is formed by a number of binary storage elements (not shown), which is equal to the number of Bits in the selected Byte (eight) and the number of Bits in the Residue Byte (nine). Connected to each of the storage elements in the Selected Byte Register 72 is a column line 77. The column lines 77, as shown, intersect selected row lines 44. A column line 79 is connected to each of the storage elements in the Residue Byte Register 74. Each of the column lines 79, as shown, intersects all of the row lines 44 and the parity line 57. The second-level matrix 70 is also provided with eight control lines 80 each of which intersects all of the column lines 77 and 79 and the row lines 44 and 57. Each of the control lines 80 is separated by the space of one column line, and terminates at an output position of a Second-Level Decoder 82. The Second-Level Decoder 82 is similar in function and construction to the First-Level Decoder 58. However, since the second-level matrix has only eight control lines 80, the second-Level Decoder 82 has only eight output positions, designated as 0, 1, 2, . . . 7. If necessary, appropriate power drivers may be connected between the outputs of the first-level decoder and second-level decoder and the diagonal drive lines for driving the group of switching elements associated with the selected line.

Located at each intersection of a row line 44, a column line 77 and a control line 80 is a switching element 55, again schematically represented by a dot, which is similar to the switching elements 55 of the first-level matrix 30, in that they are of effectively AND circuits. Additional switching elements 55 are also located at each intersection of a row line 44, a column line 79 and a control line 80 and at each intersection of the parity row line 57 with a column line 79 and a control line 80. The second-level matrix switching elements 55 are therefore connected to the Selected Byte Register 72 and the Residue Byte Register 74 in a predetermined pattern. The AND logic circuit for a second level matrix switching element is shown in FIGURE 1B. This circuit has a row line 44 as one input, a control line 80 as a second input and a column line 77 as an output. In operation, when a signal is placed on a row line 44 of the first level matrix, the second level matrix switching element will have this signal on its output line 77 when a gating signal is applied to its control line 80. When transistors are used for the switching elements of the second-level matrix 70, the transistor emitter electrodes are connected to the control lines, the base electrodes are connected via suitable driving circuits to the row lines and the collector electrodes are connected to the column lines.

The Bit representing information which is supplied from the switching elements 55 of the first-level matrix 30 is applied to the inputs of the switching elements 55 which are associated with the row line 47, or parity line 57, over which a particular Bit was transferred. For example, the Bit of information which is supplied from the selected switching element which is located along the uppermost row line 44 of the first-level matrix 30 is applied to the inputs of one switching element 55 which is connected to the Selected Byte Register 72 and seven switching elements 55 which are connected to the Residue Byte Register 74. In this manner, each switching element 55 of the second-level matrix 70 is supplied with the Bit representing information, including the Parity Bit, which was transferred along its associated row line, from the first-level matrix 30. The outputs of these switching elements along a row line of the second-level matrix are connected to both the Selected Byte Register 72 and the Residue Byte Register 74.

Since the Bits of information of the two Byte group are now present at the inputs of the switching elements 55 of the second-level matrix 70, which are located along different control lines 80 under the Selected Byte Register 72 and the Residue Byte Register 74, in order to obtain the desired Byte, it is necessary to apply a control signal to the control line 80 which is connected to the eight switching elements 55 having the Bit representing signals of the desired Byte present at their inputs and having their outputs connected to the Selected Byte Register 72. It should be noticed that for any desired Byte, one and only one control line 80 has eight switching element inputs located along it, to which are applied the eight Bits of the selected Byte, and whose outputs are connected to the Selected Byte Register 72. For example, if the selected Byte is from Bit 4 of Byte 2 to Bit 3 of Byte 3 of the Register 32, the desired Bit representing information is transferred to the second-level matrix 70 on the fifth to the twelfth row of lines 44. The eight switching elements 55 whose inputs are associated with the fifth to the twelfth row lines 44 and whose outputs are connected to the Selected Byte Register 72, lie along the control line 80 which is connected to the number 4 output position of the Second-Level Decoder 82. There is no other control line 80 which has eight switching elements whose outputs are connected to the Selected Byte Register 72 for these particular eight Bits.

It should also be noted that the second-level matrix 70 is so constructed so that the parity row line 57 is at the bottommost portion of the matrix. Since no column lines 77 intersect the parity row line 57, the Parity Bit can never appear at the Selected Byte Register 72. This arrangement is proper since the Parity Bit is used only for checking purposes and does not contain any of the data being transferred. If it were desired to construct an embodiment of the invention wherein the column lines 77 intersected the parity row line 57, there would be no switching elements 55 placed at these intersections.

The selection and energization of a control line 80 with a control signal, to gate the Bit representing information through the switching elements 55 which are located along it onto the column lines 77 and 79, is accomplished by supplying Address Bits from the Byte Address Register 59 over lines 81 to the Second-Level Decoder 82, in a manner similar to the operation of the First-Level Decoder 58. In this instance, since the Second-Level Decoder 82 has only eight output positions, only three Address Bits are required to select one of the eight outputs.

The Bits of information which are gated through the switching elements 55 located along the selected control line 80 and applied to the column lines 77, along which they are conveyed to the Selected Byte Register 72. These Bits are stored by the Register 72 and conveyed to any suitable output device over line 84. The extra Bits of information and the Parity Bit which were Read Out are applied to the storage elements of the Residue Byte Register 74 by means of the column lines 79.

The parity of the eight Bits in the Selected Byte Register 72 is compared with the parity of the nine Bits in the Residue Byte Register 74. This is accomplished in a manner similar to that described with respect to the comparison of two adjacent Bytes of the Register 32. Because the Residue Byte contains the Parity Bit for the sixteen Bits of the selected Byte, the odd-even parity count of the Residue Byte, if correct, will be equal to the odd-even parity count of the Selected Byte. If the parity counts for the Selected Byte and the Residue Byte are correct, which signifies no error in the data transfer, there will be no output from the parity circuit which is used to compare the parity of these two Bytes.

The parity circuit which checks the parity of the Selected Byte, and produces a parity signal thereof, is designated as $P_s$ and is shown located within the block 86. Since, in the illustrative embodiment shown, the Selected Byte has eight Bits, the parity circuit shown and described with respect to FIGURE 2 may be used. The circuit which is used to check the parity of the Residue Byte, and produce a parity signal representative thereof, is designated as $P_r$ and is shown located within the block 88. Since, in the illustrative embodiment shown, the Residue Byte has nine Bits, the parity circuit of FIGURE 2 would not be suitable. A circuit which is suitable for operation with a nine Bit Byte is shown in FIGURE 3. This circuit is similar to the parity circuit of FIGURE 2, with the exception that a fourth tier, EXCLUSIVE OR circuit has been added. One input of the fourth tier EXCLUSIVE OR circuit is from the output line of the third tier EXCLUSIVE OR circuit and the other input is from the ninth Bit of the storage register. The operation of the parity circuit of FIGURE 3 is similar to that of a circuit of FIGURE 2 except that after the parity of eight Bits has been checked, the ninth Bit is compared with the eight Bit resultant parity Bit signal to produce the final Parity Bit for the nine Bit Residue Byte.

The output signal from the $P_s$ parity circuit 86 is conveyed over line 90 to one input of another parity circuit, P, which is shown within block 92. The P parity circuit 92 receives its other input over line 93 from the output of the $P_r$ parity circuit 88. The output of the $P_s$ parity circuit 86 may be taken off separately, if desired, by means of output line 90.

The parity signals which are produced in the $P_s$ and $P_r$ parity circuits 86 and 88 are checked by a parity circuit 92, which may be a single EXCLUSIVE OR circuit. If the parity of these two parity signals is correct, i.e. two 0's or two 1's, it is indicated by the production of a binary 0 at the output line 95 of the parity circuit 92 which is indicative of correct data transfer. If an error occurred during the data transfer from the first to the second register, as indicated by the occurrence of a 1 and a 0 at the outputs of the $P_s$ and $P_r$ parity circuits 86 and 88, a 1 is produced at the output 95 of the P parity circuit 92. In this manner, the accuracy of the information which is transmitted from the Register 32, through the first-level matrix 30 and the second-level matrix 70 to the register 72 may be checked for any selected Byte of information.

To illustrate the operation of the present invention consider an illustration where it is desired to select an 8 Bit Byte from the Storage Register 32 beginning at Bit 2 of Byte 2 and ending at Bit 1 of Byte 3. It should be remembered that in selecting this desired Byte, all of the Bits of information which are present in Byte 2 and Byte 3 must be Read Out. For the purposes of this example, assume that the binary information stored in Byte 2 and Byte 3 of the Storage Register 32 is as follows:

| | Byte 2 | | | | | | | | Byte 3 | | | | | | | |
|---|---|---|---|---|---|---|---|---|---|---|---|---|---|---|---|---|
| Bit | 0 | 1 | 2 | 3 | 4 | 5 | 6 | 7 | 0 | 1 | 2 | 3 | 4 | 5 | 6 | 7 |
| | 1 | 0 | 1 | 0 | 1 | 1 | 0 | 0 | 0 | 1 | 1 | 0 | 1 | 0 | 1 | 1 |

Selected Byte

It will be noted that Byte 2 has an even number of 1's while Byte 3 has an odd number of 1's. Consequently, if an even parity system is used, the Parity Bit which is produced by parity circuit $P_{2,3}$ for these two Bytes is a 1 to provide an even number of 1's. This can be seen from the following analysis.

Byte 2: 0 Output of $P_2$ (61), Input to $P_{2,3}$ (68)

Byte 3: 1 Output of $P_3$ (61), Input to $P_{2,3}$ (68)

1 Output of $P_{3,3}$ (68)—Parity Bit

The binary 1 Parity Bit produced by the $P_{2-3}$ parity circuit 68 is applied over line 56 to the input of the switching element 55 located on the parity row line 57.

In order to Read Out the selected Byte, the Byte Register 59 is operated so that the control line 50 which is connected to the number 2 output position of the First-Level Decoder 58 is energized. This is accomplished by having the Byte Address Register 59 produce an Address of Address Bits 0010, which correspond to the binary notation for the number 2. When the control line 50 which is connected to the number 2 output of the First-Level Decoder 58 is supplied with a control signal, the Bit representing information, which is stored in the register storage elements associated with it, is Read Out and transferred by means of the switching elements 55 onto the row lines 44 and the parity row line 57 to the inputs of the switching elements 55 of the second-level matrix 70.

In order to separate the desired Byte from the seventeen Bits which were transferred from the first-level matrix 30, the Second-Level Decoder 82, in response to three Address Bits 010 (binary 2) over line 81 from the Byte Address Register 59, supplies a control signal to the control line 80 which is connected to the number 2 output of the Second-Level Decoder 82. The Bit representing information which is applied to the inputs of the switching elements 55 located along this selected control line is gated through to the Selected Byte Register 72 and the Residue Byte Register 74. The following Bits of information are present at each of the registers.

| Selected Byte | Residue Byte |
|---|---|
| 1 0 1 1 0 0 0 1 | 1 0 1 0 1 1 1 1 0 |

The Selected Byte consists of the last six bits of Byte 2 and the first 2 Bits of Byte 3 which was the desired Byte for the assumed example. The Residue Byte consists of the remaining six Bits of Byte 3 the Parity Bit and the first two Bits of Byte 2. It should be realized that before the data transfer was initiated and after the first-level matrix Parity Bit was produced, that there were an even number of 1 Bits in the 17 Bit total selected by the first level matrix 30, i.e., four 1 Bits in Byte 2, five 1 Bits in Byte 3, and a 1 Parity Bit. Consequently, since there was an even number of 1 Bits in the two Byte group and the Parity Bit, the total number of 1 Bits in the Selected Byte and the Residue Byte must also be even if the data transfer from the first to the second register is correct. This is determined by the EXCLUSIVE OR circuits which form $P_s$, $P_r$ and P parity circuits 86, 88 and 92 of the second-level matrix. If there was no error during the data transfer, the presence of an even number of 1 Bits in each of the $P_s$ and P circuits 86 and 88 is signalled by the production of a 0 Bit on line 95. It should be noted, however, that there may be instances where the Selected Byte has an odd number of 1 Bits in which case the Residue Byte would also have an odd number of 1 Bits, making an even number total if there were no error in the transfer. This condition would be sensed by the P parity circuit 92, which, in response to a 1 Bit produced by each of the $P_s$ and $P_r$ parity circuits 86, and 88, would produce an 0 Bit signalling no error. An error in the transfer is signified by the occurrence of an even number of 1 Bits at one of the two Registers 72 and 74 and an odd number of 1 Bits at the other. This means that a 1 Bit has been added to or dropped from the even number of 1 Bits originally contained in the seventeen Bits selected by the first-level matrix 30. This condition is sensed by the $P_s$ and $P_r$ parity circuits 86 and 88 and a 1 Bit, signifying an error, is produced by P parity circuit 92 on line 95. This 1 Bit signal may be used to disable the computer for an instant, so that fruitless calculations on erroneous data will not be performed or else to turn on an error trigger, which would include the error.

It should be noted that the bottom row line 44 of the second-level matrix 70 has no switching elements located along it which are connected to the Selected Byte Register 72. In order to use the even parity system, two full Bytes of information must be selected from the Storage Register 32, and hence the necessity of the bottom row line 44. However, the bottom row line 44 is only associated with Bit 7 of each Byte of the Storage Register 32. The information from Bit 7 also appears at the switching elements 55 located along the eighth row line 44 down. If it is desired to select a Byte of information which contains Bit 7 of one of the Bytes, it is only necessary to select the next adjacent control line 50 so that the information from Bit 7 may be included on the eighth row line down.

While the data checking system of the present invention has been described with respect to a Storage Register having sixteen eight Bit Bytes, or a 128 Bit Word, it should be realized that the system may be used with any other size Storage Register in which any size Byte of information is to be handled. Also, while the system has been described as using an even parity system, i.e., an even number of 1 Bits present after the parity check has been made, it should be realized that an odd parity system may also be used, i.e. having an odd number of 1 Bits present after the parity check is made. Suitable parity checking circuits for the odd parity system may be designed by one skilled in the art.

In some instances, it may be desirable to check the parity of the information which is stored in half of the Storage Register 32 against the information which is stored in the other half. This may be accomplished by providing two parity circuits, one of which is connected to the $P_{1-i,\,i}$ and $P_{i,\,i+1}$ parity circuits $P_{0,\,1}$, $P_{2,\,3}$, $P_{4,\,5}$, $P_{6,\,7}$ and the other of which is connected to the parity circuits $P_{8,\,9}$, $P_{10,\,11}$, $P_{12,\,13}$, $P_{14,\,15}$. The outputs of each of these two parity circuits, which may for example be a two tier EXCLUSIVE OR arrangement, will then produce a Parity Bit which is representative of the parity check of the information of each half of the Word in the Storage Register 32. The parity of each half of the Word may then be checked by another parity circuit.

Therefore, it is seen that a novel system for checking the accuracy of data handling including a two-level selecting network has been provided. The checking system of the present invention requires only the addition of the necessary parity circuitry, a number of switching elements for the first-level matrix which is equal to the number of Bytes in the Storage Register, and a number of switching elements in the second-level matrix which is equal to the product of the number of Bits in a Byte and one plus the number of Bits in a Byte, i.e. $8 \times 9$ equals 72.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

What is claimed is:

1. Apparatus for checking data transfer comprising a plurality of storage means, each of said storage means storing a bit of information which is represented by a first or a second signal, means for generating a parity bit which is representative of the number of first bit representing signals in a group of N bits, first selecting means, said first selecting means arranged in a number of column lines which are connected to said storage means and said parity bit generating means and a number of row lines and control lines which intersect said column lines, each control line intersecting all of said row lines and the column lines which are connected to the storage means which store the N bits of information, and the parity bit generating means, a plurality of switching elements each associated with a different intersection of said row, column and control lines, means for selecting and energizing one of said control lines to read out the bit representing signals from the group of $N+1$ switching elements which are located along it and applying them to the row lines, second selecting means connected to said row lines for selecting less than N bit representing signals from said N bit representing signals, means for checking the parity of the selected less than N bit representing signals and producing a first parity signal indicative thereof, means for checking the parity of the residue bits and parity bit representing signals and producing a second parity signal indicative thereof and means for comparing said first and second parity signals to produce a signal which is indicative of the correctness of the data transfer between the two selecting means.

2. Apparatus for checking data transfer comprising a plurality of storage means, each of said storage means storing a bit of information which is represented by a first or a second signal, means for generating a parity bit which is representative of the number of first bit representing signals in a group of N consecutive bits, first selecting means, said first selecting means arranged in a number of column lines which are connected to said storage means and said parity bit generating means and a number of row lines and control lines which intersect said column lines, each control line intersecting all of said row lines and the column lines which are connected to the storage means which store the N bits of information and the parity bit generating means, a plurality of switching elements each associated with a different intersection of said row, column and control lines, each of said switching elements representing the first or second signal of the bit of information which is stored in the storage means connected to its associated column line, means for selecting and energizing one of said control lines to read out the bit representing signals from the group of $N+1$ switching elements which are located along it and applying them to the row lines, second selecting means connected to said row lines for selecting $N/2$ consecutive bit representing signals from said N bit representing signals beginning at any bit position of the N bits, a utilization device connected to receive only the selected $N/2$ bit representing sinals, means for checking the parity of the selected $N/2$ bit representing signals and producing a first parity signal indicative thereof, means for checking the parity of the $N/2$ residue bits and parity bit representing signals and producing a second parity signal indicative thereof and means for comparing said first and second parity signals to produce a signal which is indicative of the correctness of the data transfer.

3. Apparatus for checking data transfer comprising a plurality of storage elements, each of said storage elements storing a bit of information which is represented by a first or a second signal, means for generating a parity bit which is representative of the number of first bit representing signals in two groups of bits, each of said groups having $N/2$ bits, first selecting means, said first selecting means arranged in a number of column lines which are connected to said storage elements and said parity bit generating means, $N+1$ row lines, and a number of control lines which intersect said column lines, each control line intersecting all of said row lines and the column lines which are connected to the plurality of storage elements of two groups of $N/2$ bits of information and the parity bit generating means, a plurality of switching elements each associated with a different intersection of said row, column and control lines, means for selecting and energizing one of said control lines to read out the bit representing signals applied to the group of $N+1$ switching elements which are located along it and applying them to the row lines which are associated with said switching elements, a second selecting means, said second selecting means arranged in a number of column lines and row and control lines each of which intersect all of said second selecting means column lines, a switching element associated with a different intersection of said row, column and control lines of said second selecting means, said row lines of said second selecting means being continuations of said row lines of said first selecting means, a utilization device, means for connecting the $N/2$ column lines of said second selecting means which are not associated with the switching elements to which the parity bit representing signal is applied to said utilization device, means for selecting and energizing a control line of said second selecting means to read out the bit representing signals applied to the $N+1$ switching elements located along it onto associated column lines of said second selecting means, $N/2$ bit representing signals being read out into said utilization device and $N/2$ bit representing signals plus the parity bit representing signal forming a residue, means for checking the parity of $N/2$ bit representing signals read out into said utilization device and producing a first parity signal which are connected to the plurality of storage elements of the residue bit representing signals and producing a second parity signal which is indicative thereof, and means for comparing said first and said second parity signals to produce a signal indicative of the correctness of the data transfer.

4. Apparatus for checking data transfer comprising a storage register, said storage register having a plurality of storage elements which are arranged in a plurality of adjacent byte size groups of $N/2$ storage elements, each of said storage elements storing a bit of information which is represented by a first or a second signal, means for generating a parity bit which is representative of the number of first bit representing signals in two adjacent bytes of $N/2$ bits, first selecting means, said first selecting means arranged in a number of column lines which are connected to said storage elements and said parity bit generating means, $N+1$ row lines, and a number of control lines which intersect said column lines, each control line intersecting all of said $N+1$ row lines and the column lines which are connected to the plurality of storage elements of two adjacent byte size groups of $N/2$ bits of information and their associated parity bit generating means, said control line being separated from each other by $$\frac{N}{2}+1$$

column lines, a plurality of switching elements each associated with a different intersection of said row, column and control lines, means for selecting and energizing one of said control lines to read out the bit representing signal applied to the group of $N+1$ switching elements which are located along it and applying them to the row lines which are associated with said switching elements, a second selecting means, said second selecting means arranged in $N+1$ column lines, $N+1$ row lines and N control lines, each of said row and control lines intersecting all of said second selecting means column lines and said control lines being separated from each other by one column line, a switching element associated with a different intersection of said row, column and control lines of said second selecting means, said row lines of said second selecting means being continuations of said row lines of said first selecting means, a second storage register having $N/2$ storage elements, means for connecting the $N/2$ column lines of said second selecting means to the storage elements of said second register which are not associated with the switching elements to which the parity bit representing signal is applied, a third register having $$\frac{N}{2}+1$$

storage elements, means for connecting the remaining $$\frac{N}{2}+1$$

column lines to the storage elements of said third register, means for selecting and energizing a control line of said second selecting means to read out the bit representing signals applied to the $N+1$ switching elements located along it onto associated column lines of said second selecting means, $N/2$ bit representing signals being read out into said second register and $N/2$ bit representing signals plus the parity bit representing signal being read out into said third register, means connected to said second register for checking the parity of $N/2$ bit representing signals stored in it and producing a first parity signal which is indicative thereof, means connected to said third register for checking the parity of the $$\frac{N}{2}+1$$

bit representing signals stored in said third register and producing a second parity signal which is indicative thereof, and means connected to said means for producing said first and second parity signals for comparing said first and said second parity signals to produce a signal indicative of the correctness of the data transfer between the first register and the second register.

5. Apparatus for checking the accuracy of data selection and transfer from a storage means to a utilization device comprising means for storing a plurality of bits of data in a plurality of bytes, each byte having a plurality of consecutive bits of data and each of said data bits being represented by a first or a second signal, means for producing an original parity bit represented by one of said first or second signals which is indicative of the number of said first and second signals present in two adjacent stored bytes, first means for selectively picking out from said storing means a selected group of bit representing signals, said selected group including the bit representing signals of the data bits of two adjacent stored bytes and their associated original parity bit, a utilization device, second means for selectively picking out from said selected group of bit representing signals for transfer to said utilization device a byte size group of consecutive data bit representing signals starting at any bit position within said selected group, means for checking the parity of the data bit representing signals in the byte picked out by said second means and for producing a first parity signal indicative thereof, means for checking the parity of the data bit representing signals of the remaining unpicked data bits of said selected group and the original parity bit and for producing a second parity signal indicative thereof, and means for comparing said first parity signal and said second parity signal to provide a signal which is indicative of the correctness of the data selection and data transfer to said utilization device.

6. Apparatus for checking the accuracy of data selection comprising means for storing a plurality of bits of data in a plurality of first groups, each of said first groups having $N/2$ consecutive bits of data and each of said data bits being represented by a first or a second signal, means for producing an original parity bit represented by one of said first or second signals which is indicative of the number of said first and second signals present in two adjacent stored first groups, first means for selectively picking out from said storing means a selected group of bit representing signals, said selected group including the bit representing signals of the N data bits of two adjacent stored first groups and their associated original parity bit, second means for selectively picking out from said selected group of bit representing signals a second group of $N/2$ consecutive data bit representing signals starting at any bit position within said selected group, means for checking the parity of the $N/2$ data bit representing signals in the second group picked out by said second means and for producing a first parity signal indicative thereof, means for checking the parity of the $N/2$ data bit representing signals of the remaining unpicked data bits of said selected group and the original parity bit and for producing a second parity signal indicative thereof, and means for comparing said first parity signal and said second parity signal to provide a signal which is indicative of the correctness of the data selection.

7. Apparatus for checking the accuracy of data selection comprising means for storing a plurality of bits of data in a plurality of first groups, each of said first groups having a plurality of bits of data and each of said data bits being represented by a first or a second signal, means for producing an original parity bit represented by one of said first or second signals which is indicative of the number of said first and second signals present in a plurality of said stored first groups, first means for selectively picking out from said storing means a selected group of bit representing signals, said selected group including the bit representing signals of the data bits of a plurality of said first groups and their associated original parity bit, second means for selectively picking out from said selected group of bit representing signals a second group of data bit representing signals having less than the number of bit representing signals in said selected group and starting at any bit position within said selected group, means for checking the parity of the second group of data bit representing signals picked out by said second means and for producing a first parity signal indicative thereof, means for checking the parity of the data bit representing signals of the remaining unpicked data bits of said selected group and the original parity bit and for producing a second parity signal indicative thereof, and means for comparing said first parity signal and said second parity signal to provide a signal which is indicative of the correctness of the data selection.

8. Apparatus for checking the accuracy of data selection comprising means for storing a plurality of bits of data in a plurality of first groups, each first group having a plurality of bits of data and each of said data bits being represented by a first or a second signal, means for producing an original parity bit represented by one of said first or second signals which is indicative of the number of said first and second signals present in a plurality of said stored first groups, first means for selectively picking out from said storing means a selected group of bit representing signals, said selected group including the bit representing signals of the data bits of a plurality of said first groups and their associated original parity bit, second means for selectively picking out from said selected group of bit representing signals a second group of data bit representing signals having less than the number of bit representing signals in said selected group and starting at any bit position within said selected group, means for checking the parity of the second group of data bit representing signals picked out by said second means and for producing a first parity signal indicative thereof, and means for checking the parity of the data bit representing signals of the remaining unpicked data bits of said selected group and the original parity bit and for producing a second parity signal indicative thereof.

References Cited in the file of this patent

UNITED STATES PATENTS

| | | |
|---|---|---|
| 2,844,812 | Auerbach | July 22, 1958 |
| 2,848,607 | Maron | Aug. 19, 1958 |

UNITED STATES PATENT OFFICE
CERTIFICATE OF CORRECTION

Patent No. 3,045,209 July 17, 1962

James H. Pomerene

It is hereby certified that error appears in the above numbered patent requiring correction and that the said Letters Patent should read as corrected below.

Column 13, line 37, for "are connected to the plurality of storage elements" read -- is indicative thereof, means for checking the parity --.

Signed and sealed this 4th day of December 1962.

(SEAL)
Attest:

ERNEST W. SWIDER
Attesting Officer

DAVID L. LADD
Commissioner of Patents